Sept. 10, 1929.  E. WILDHABER  1,727,739
METHOD OF PRODUCING BEVEL GEARS
Filed Feb. 28, 1927
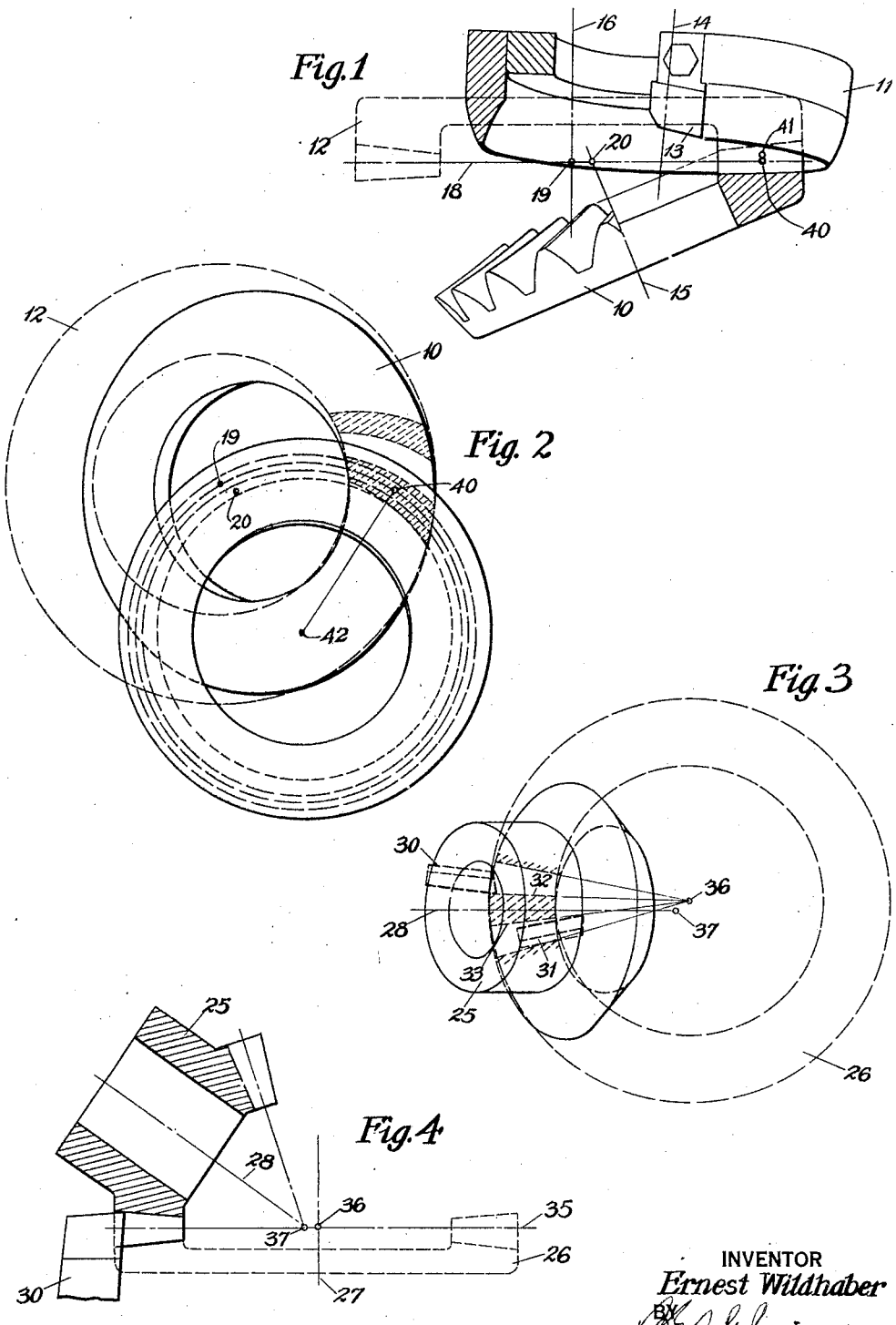
INVENTOR
*Ernest Wildhaber*
BY
ATTORNEY Patented Sept. 10, 1929.

1,727,739

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF PRODUCING BEVEL GEARS.

Application filed February 28, 1927. Serial No. 171,606.

The present invention relates to bevel gears and to a method of producing the same.

The primary object of this invention is to provide a method for producing bevel gear pairs, in which the tooth surfaces of each member may be cut two sides simultaneously without producing "bias bearing" when the gears run together.

A further object of this invention is to provide a method for cutting bevel gears, in which the tooth surfaces of each member are cut two sides simultaneously, in which complete freedom is had in the selection of the spiral angles of the gears to be so produced.

A still further object of this invention is to provide a method for cutting bevel gears in which the tooth surfaces of each member may be cut two sides simultaneously in such manner that the teeth taper in depth along their length in proportion to the taper of the gear itself with the tooth bottoms running substantially to the gear apexes, so that the gears are just as strong as gears whose tooth surfaces are cut one side at a time.

A further object is to provide a method whereby longitudinally curved tooth bevel gears may be cut two sides simultaneously with any desired spiral angle using a rotary annular face mill of a given diameter, the diameter being preferably one of a series of standard diameters.

A further object of this invention is to provide a method for cutting bevel gears two sides simultaneously which will permit of readily "mismatching" their tooth surfaces, to concentrate the bearing between contacting tooth surfaces at the center of the faces while it diminishes toward the ends, so that a gear pair will readily adjust itself to variations in mountings and will readily accommodate itself to sudden loads.

Other objects of the invention will be apparent hereinafter from the specification and from the recital of the appended claims.

In the accompanying drawings, I have illustrated two particular applications of this invention. It will be understood, however, that the invention is capable of further modification and use within its scope and within the limits of the accompanying claims.

In the drawings:

Figures 1 and 2 are a plan view and side elevation, respectively, illustrating diagrammatically the preferred method of producing longitudinally curved tooth bevel gears with this invention; and Figures 3 and 4 are a side elevation and plan view, respectively, illustrating one method of producing straight tooth bevel gears, according to this invention.

Heretofore, it has been customary to generate bevel gears by imparting a relative rolling movement between the tool employed and the blank, as though the blank were rolling with a basic gear, usually a crown gear, whose axis intersected the blank axis in its apex.

With the present invention, both members of a pair of bevel gears are generated from a pair of complementary crown gears, whose axes are offset from the axes of the blanks. This method permits of producing both members of a pair of bevel gears in operations in which two side tooth surfaces are cut simultaneously and in which the teeth may be made tapering in depth and provided with tooth bottoms which run substantially to the pitch cone apex. Curved tooth bevel gears may be cut, moreover, so that the tooth bearing between mate gears will extend substantially straight up the tooth profiles, thereby eliminating the undesirable diagonal or bias bearing. With either straight or curved tooth gears, any desirable degree of "mismatch" may be obtained, that is, the tooth bearing may be concentrated to any desired extent in the center of the contacting tooth faces and allowed to diminish toward the ends. Gears cut with this invention, accordingly, are capable of sufficient adjustment to accommodate themselves to variations in mountings and variations in loads.

Figures 1 and 2 illustrate the preferred method of producing curved tooth bevel gears with this invention. As already indicated, the tooth surfaces of both members of the pair are generated in an operation in which the blank moves relatively to the tool as though it were meshing with a basic gear whose axis is offset from the axis of the blank.

10 indicates a gear blank and 11 designates the tool which is preferably employed to cut the blank. The tool 11 is in the form of a rotary annular face mill and is provided with finish cutting edges which are of circular arc profile, representing spherical tooth surfaces of the basic gear, the crown gear 12, to which the tooth surfaces of the gear 10 are to be generated conjugate. The present invention is particularly applicable to the production of bevel gears where two side tooth surfaces of each member are cut simultaneously. For this purpose, the tool 11 will be provided with cutting edges adapted to finish cut opposite side tooth faces of the blank. Each blade 13 of the tool may be provided with a pair of finish cutting edges, or alternate blades 13 may be provided with finish cutting edges for finish cutting opposite side tooth faces of the blank.

In the generating operation, the tool 11 is rotated on its axis 14, while the blank 10 is rotated on its axis 15 and while simultaneously an additional relative movement is imparted between the tool and blank about an axis 16 which is offset from the axis 15 of the blank and which represents the axis of the basic gear 12. In the embodiment of my invention illustrated, the basic gear 12 is a true crown gear having a plane pitch surface 18. The apex or center of this basic gear 12 is at 19, offset from the apex 20 of the blank 10, the axes 15 and 16 of the blank and crown gear, respectively, being non-intersecting and non-parallel.

The finish cutting edges of the tool 11 will simultaneously generate two adjacent side tooth faces of the blank 10. The tool and blank will then be withdrawn relatively to each other and the blank indexed, the blank being then returned into engagement with the tool and a new pair of tooth surfaces will be cut. Alternate cutting and indexing will proceed until the gear 10 is completed.

The mating gear or pinion will be cut in exactly the same manner, the crown gears which are represented by the tools and which are used to generate a pair of mating bevel gears according to this invention being preferably complementary. Their offset, their spiral angles, and their cone distances are equal and the hands of their spirals are opposite. Both members of a curved tooth bevel gear pair, may, accordingly, be produced on a gear generator of the character described in my copending application No. 77,310, filed December 23, 1925.

While I prefer to use a face mill in cutting curved tooth bevel gears with this invention, it will be understood that if desired a pair of planing tools which move in arcuate paths may be employed also. The present invention is applicable, also, to the production of curved tooth bevel gears in a hobbing operation, where the tool is either a face mill or a worm hob. By hobbing spiral bevel gears with a worm hob conjugate to an offset crown gear, it is possible to obtain smaller spiral angles on the gears than can be produced with the usual hobbing method, where the axis of the basic gear or crown gear, which the hob represents, intersects the axis of the blank in its apex.

The present invention is applicable also to the production of straight tooth bevel gears. This is illustrated in Figures 3 and 4, which illustrate the production of a gear blank 25 conjugate to a basic gear, crown gear, 26 whose axis 27 is offset from the axis 28 of the blank 25. In the generating operation, the planing tools 30 and 31, which represent side tooth surfaces of the crown gear 26 are reciprocated across the face of the blank 25, to cut two side faces 32 and 33 of the blank simultaneously, while simultaneously a relative movement is imparted between the tools and blank as though the blank were meshing with the basic gear 26. In this relative movement the blank is, preferably rotated on its axis 28 and the tools and blank are simultaneously moved relatively to each other about an axis 27 which is offset from the axis 28 of the blank and which represents the axis of the basic gear 26.

As with the curved tooth gears, the basic gear used in generating straight tooth gears according to this invention is, preferably, a true crown gear, having a plane pitch surface 35. The apex or center of the crown gear is at 36 and the apex of the blank is at 37. Instead of a true crown gear, however, a nominal crown gear, that is, a gear whose top surface is a plane and whose pitch surface is a cone, may be used as the basic gear, or any other suitable type of basic gear may be employed whether straight or curved tooth gears be cut.

In the embodiment illustrated, the basic gear 26 is provided with straight radial teeth and the tools 30 and 31 reciprocate in paths which converge in the basic gear apex or center 36. Instead of radial teeth, however, the basic gear may have non-radial or skew teeth, in which case the tools will move in paths converging in a point offset from the basic gear apex or center.

Where planing tools such as 30 and 31, moving in straight paths across the face of the blank, are employed, the blank may be intermittently (periodically) indexed or continuously indexed. In the first case, the tools and blank are withdrawn relatively to each other after one tooth of the blank has been cut and the blank is indexed. The tool and blank are then returned into engagement and a new tooth of the blank is cut. The alternate cutting and indexing proceeds until the blank has been finished. Where the continuous indexing method is employed, the tools will cut new tooth faces of the blank on each stroke and a spiral tooth will be produced on the blank, the tools representing a basic gear having spiral teeth.

The primary purpose of the present invention is, of course, to permit of cutting bevel gears two sides simultaneously, while avoiding "bias bearing" and, moreover, to permit of any desired mismatching of mating tooth surfaces. To avoid bias bearing, the point of contact between mating tooth surfaces of the gears should move substantially from the bottom to the top of the tooth surfaces during mesh. The manner in which the amount of offset of the crown gear axis from the blank axis can be determined to secure the desired conditions, will now briefly be explained.

We assume a mean point of contact between the gears, as the point 40, Figures 1 and 2. This point will, of course, be taken, also, as a mean point of contact between each of the gears and the basic gear from which it is to be generated. Since we desire that the contact between the gears themselves shall extend straight up their tooth faces, we must construct the gears so that any point, as the point 41, directly above or below the mean contact point 40 will become a point of contact between the gears when they roll together. For the sake of simplicity in calculation, infinitesimal distances only are considered. The position that the point 41 assumes when it becomes a point of contact between the gears is then determined. We then select a basic gear of such form that its tooth surfaces will contact with the tooth surfaces of the gear (or pinion) in the mean contact point 40 and that a point on the tooth surface of the basic gear outside the mean contact point 40 will make contact with the point 41 in the same position at which the point 41 becomes a point of contact between the mating gears themselves. When the gear is generated conjugate to such a basic gear and the pinion is generated conjugate to a complementary basic gear, tooth surfaces will be produced on the gear and pinion which will contact at 40 and at other points 41 above or below the mean contact point 40, so that the point of contact of the mating tooth surfaces of the gear and pinion will move straight up the tooth profiles of gear and pinion during their mesh and thus bias bearing will be eliminated.

The calculations upon which the determination of the position of the crown gear, (basic gear) are based are as follows: At a mean point of contact between the crown gear (basic gear) and pinion a certain moment will be exerted on the crown gear by a force acting in the direction of the tooth normal. If the component of that force which acts in the pitch plane of the crown gear is assumed as unity, then the moment $M_3$ may be determined as:

$M_3 = A_3 \cos h_3$, where $A_3$ is equal to the cone distance of the crown gear, the distance 19—40 in Figure 2, and $h_3$ is equal to the spiral angle of the crown gear.

At some other point of the crown gear tooth surface which becomes a point of contact with the point 41 of the gear or pinion tooth surface in the same position where the point 41 becomes a point of contact between the gear and pinion, the moment exerted on the crown gear will be increased over the moment exerted at the mean contact point 40. The increment of moment, $dM_3$, is determined as follows:

$$dM_3 = -\frac{s}{\sin a \cos a} \cdot \cos h \cdot \frac{\sin(h-h_3)}{\cos h_3}\left[1 - \frac{A_3 \sin h_3}{r}\right],$$

where $s$ is the distance of the point 41 above or below the mean contact point 40, $a$ is the pressure angle of the crown gear, $h$ the spiral angle of the gear 10 to be produced, and $r$ the radius of curvature of the crown gear teeth, that is, the cutter radius, the distance 42—40 in Figure 2.

The ratio of the total moment to the increment moment is then:

$$\frac{dM_3}{M_3} = -\frac{s \cdot \cos h}{A_3 \cos h_3 \sin a \cos a} \cdot \frac{\sin(h-h_3)}{\cos h_3}\left[1 - \frac{A_3 \sin h_3}{r}\right]$$

which reduces to:

$$\frac{dM_3}{M_3} = -\frac{s}{A} \cdot \frac{\sin h}{\sin a \cos a} \cdot \left[1 - \frac{\tan h_3}{\tan h}\right]\left[\frac{A \cos h}{A_3 \cos h_3} - \frac{A}{r} \cos h \tan h_3\right],$$

where $A$ is the cone distance of the gear to be produced, the distance 20—40, Fig. 2.

In a similar manner, the total moment exerted on the gear can be computed as:

$$M_1 = A \cos h \sin P,$$

where $P$ is the pitch cone angle of the gear to be produced.

The increment moment on the gear when the point 41 of the gear becomes a point of contact with a point of the tooth surface of the crown gear in the position where the point 41 is a point of contact between the gear and pinion is:

$$dM_1 = -\frac{s}{\sin a \cos a} \cos h \sin P \left[\sin h - \frac{\sin(h-h_3)}{\cos h_3}\frac{A \sin h}{r} - \frac{\cos h}{\cos h_3} \cdot \frac{A \sin h}{A_3}\right]$$

Whence we derive the ratio:

$$\frac{dM_1}{M_1} = -\frac{s}{A \sin a \cos a} \sin h \left[ 1 - \frac{A \cos h}{A_3 \cos h_3} - \frac{A}{r} \cdot \frac{\sin (h-h_3)}{\cos h_3} \right]$$

The same value will be obtained for the corresponding ratio of moments exerted on the pinion or gear to be cut to mate with the gear 10.

Now to realize the condition, where a point of the tooth surface of the crown gear, outside the mean contact point 40, will have contact with either gear or pinion in the same position where the point 41 becomes a point of contact between the gear and pinion themselves, the ratio of the increment moment exerted on the crown gear to the total moment exerted on the crown gear must equal the corresponding ratio of moments for the gear or pinion. That is:

$$\frac{dM_3}{M_3} = \frac{dM_1}{M_1} = \frac{dM_2}{M_2}$$

where $M_2$ is the total moment exerted on the pinion and $dM_2$ is the increment moment exerted on the pinion. Whence:

$$\left[ 1 - \frac{\tan h_3}{\tan h} \right]\left[ \frac{A \cos h}{A_3 \cos h_3} - \frac{A}{r} \cos h \tan h_3 \right] = \left[ 1 - \frac{A \cos h}{A_3 \cos h_3} - \frac{A}{r} \cdot \frac{\sin (h-h_3)}{\cos h_3} \right]$$

And, therefore:

$$\frac{A \cos h}{A_3 \cos h_3}\left[ 2 - \frac{\tan h_3}{\tan h} \right] = 1 - \frac{A}{r} \sin h \left( 1 - \frac{\tan h_3}{\tan h} \right)^2.$$

Crown gears fulfilling this condition are suitable for generating bevel gear pairs without bias on either side of the tooth.

For straight tooth gears, of course, the radius of curvature $r$ is equal to infinity.

The offset $E$ of the crown gear axis from the blank axis has been determined as:

$$E = A_3 \sin (h-h_3).$$

The inter-relation between the spiral angle of curved tooth gears, cone distance and cutter radius to permit simultaneous production of both sides of a tooth space while keeping the tooth bottoms in line with the apex can readily be determined by the known methods of descriptive geometry. This has been calculated and has been found to be:

$$\left(1 - \frac{A}{r} \sin h\right) = \frac{4 \tan a}{\pi} \cdot D \cdot \frac{2 - \frac{\tan h_3}{\tan h}}{1 + \tan h \tan h_3},$$

where D is the average dedendum at 1 diametral pitch and is usually equal to 1.2, $N_c$ being the number of teeth in the crown gear and $d$ being the average dedendum angle of the gear pair to be produced.

When a pair of curved tooth bevel gears are cut according to this invention with a rotary face mill, it is generally preferable to select a cutter which has the radius most nearly approximating the radius $r$ determined from the equations given when assuming at first $h_3 = h$. The spiral angle $h_3$ of the generating offset crown gear can then be determined as follows:

$$\tan h_3 = \tan h \frac{\frac{8 \tan a}{\pi} \cdot D - \left(1 - \frac{A}{r} \sin h\right)}{\frac{4 \tan a}{\pi} \cdot D + \tan^2 h \left(1 - \frac{A}{r} \sin h\right)}.$$

A pair of bevel gears cut from complementary crown gears in the manner described with reference to either Figures 1 and 2 or 3 and 4 will mesh together with their axes angularly disposed and intersecting and with their apexes coinciding, as do bevel gears cut with other methods, and they will transmit true uniform motion.

The principles of this invention may be applied to the grinding and lapping of gears as well as to their cutting with planing, milling or hobbing tools and the term "cutting" is intended to cover any of these operations.

While I have illustrated and described certain embodiments of my invention, it will be understood that the invention is capable of further modification within its limits and the scope of the appended claims and that this application is intended to cover any variations, uses, or adaptations of my invention, following, in general, the principles of the invention and including such departures from the present disclosure as come within known or customary practise in the gear art and as may be applied to the essential features hereinbefore set forth and as fall within the limits of the accompanying claims.

Having thus described my invention, what I claim is:

1. The method of producing a pair of bevel gears which consists in cutting the side tooth surfaces of each member of the pair by imparting a cutting movement to a tool, while rotating a tapered gear blank on its axis and simultaneously moving the tool and blank relatively to each other about an axis offset from the blank axis.

2. The method of producing a pair of bevel gears, which consists in cutting the side tooth surfaces of each member of the pair by imparting a cutting movement to a tool, while simultaneously producing a relative movement between the tool and a tapered gear blank corresponding to that of a gear meshing with a crown gear whose axis is offset from the axis of the blank.

3. The method of producing a pair of bevel gears, which consists in cutting the side tooth surfaces of each member of the pair by moving a tool in a curved path across the face of a tapered gear blank while rotating the blank on its axis and simultaneously moving the tool and blank relatively to each other about an axis offset from the blank axis.

4. The method of producing a pair of bevel gears, which consists in cutting the side tooth surfaces of each member of the pair by moving a tool in a curved path across the face of a tapered gear blank while imparting a relative movement between the tool and blank corresponding to that of a gear meshing with a crown gear whose axis is offset from the axis of the blank.

5. The method of producing a bevel gear which consists in generating its side tooth surfaces two sides simultaneously, by moving a pair of cutting edges across the face of a tapered gear blank while rotating the blank on its axis and simultaneuosly moving the tool and blank relatively to each other about an axis offset from the blank axis.

6. The method of producing a bevel gear which consists in generating its side tooth surfaces two sides simultaneously by moving a pair of cutting edges across the face of a tapered gear blank while simultaneously producing a relative movement between the cutting edges and blank corresponding to that of a gear meshing with a crown gear whose axis is offset from the axis of the blank.

7. The method of producing a bevel gear which consists in generating its side tooth surfaces two sides simultaneously by moving a pair of cutting edges in concentric curved paths across the face of a tapered gear blank while rotating the blank on its axis and simultaneously moving the tool and blank relatively to each other about an axis offset from the blank axis.

8. The method of producing a bevel gear which consists in generating its side tooth surfaces two sides simultaneously by moving a pair of cutting edges in concentric curved paths across the face of a tapered gear blank while simultaneously producing a relative movement between the cutting edges and blank, corresponding to that of a gear meshing with a crown gear whose axis is offset from the axis of the blank.

9. The method of producing a pair of bevel gears, which consists in cutting the side tooth surfaces of each member of the pair with a rotary annular face mill, by rotating said tool in engagement with a tapered gear blank while rotating the blank on its axis and simultaneously imparting an additional relative movement between the tool and blank about an axis offset from the blank axis.

10. The method of producing a pair of bevel gears, which consists in cutting the side tooth surfaces of each member of the pair with a rotary annular face mill, by rotating the tool in engagement with a tapered gear blank while imparting a relative movement between the tool and blank corresponding to that of a gear meshing with a crown gear whose axis is offset from the axis of the blank.

11. The method of producing a bevel gear which consists in generating the side tooth surfaces two sides simultaneously, by rotating an annular face mill, provided with cutting edges adapted to finish cut opposite side tooth faces of a gear blank, in engagement with a tapered gear blank while rotating the blank on its axis and simultaneously moving the tool and blank about an axis offset from the blank axis.

12. The method of producing a bevel gear which consists in employing a rotary annular face mill provided with cutting edges adapted to finish cut opposite side tooth faces of a gear blank, and rotating said tool in engagement with a tapered gear blank while simultaneously producing a relative movement between the tool and blank corresponding to that of gear rolling with a crown gear whose axis is offset from the axis of the blank.

13. The method of producing a pair of bevel gears which consists in generating the side tooth surfaces of each member of the pair two sides simultaneously, by moving a pair of cutting edges across the face of a tapered gear blank while rotating the blank on its axis and simultaneously imparting an additional relative movement between the cutting edges and blank about an axis offset from the blank axis.

14. The method of producing a pair of bevel gears which consists in generating the side tooth surfaces of each member of the pair two sides simultaneously, by moving a pair of cutting edges across the face of a tapered gear blank while simultaneously producing a relative movement between the cutting edges and blank corresponding to that of a gear meshing with a crown gear whose axis is offset from the axis of the blank.

15. The method of producing a pair of bevel gears which consists in generating the side tooth surfaces of each member of the pair two sides simultaneously, by moving a pair of cutting edges in concentric curved paths across the face of a tapered gear blank while rotating the blank on its axis and simultaneously imparting an additional relative movement between the cutting edges and blank about an axis offset from the blank axis.

16. The method of producing a pair of bevel gears which consists in generating the side tooth surfaces of each member of the pair two sides simultaneously by moving a pair of cutting edges in concentric curved paths across the face of a tapered gear blank while simultaneously producing a relative movement between the cutting edges and blank corresponding to that of a gear meshing with a crown gear whose axis is offset from the axis of the blank.

17. The method of producing a pair of bevel gears which consists in cutting the side tooth surfaces of each member of the pair two sides simultaneously with a rotary annular face mill, provided with cutting edges adapted to finish cut opposite side tooth faces of a gear blank, by rotating said tool in engagement with a tapered gear blank while rotating the blank on its axis and simultaneously imparting an additional relative movement between the tool and blank about an axis offset from the blank axis.

18. The method of producing a pair of bevel gears which consists in generating the side tooth surfaces of each member of the pair two sides simultaneously with a rotary annular face mill, provided with cutting edges adapted to finish cut opposite side tooth faces of a blank, by rotating said tool in engagement with a tapered gear blank while simultaneously producing a relative movement between said tool and blank corresponding to that of a gear meshing with a crown gear whose axis is offset from the axis of the blank.

19. The method of producing a bevel gear which consists in generating its side tooth surfaces, two sides simultaneously by moving a pair of cutting edges of circular arc profile in concentric curved paths across the face of a tapered gear blank while rotating the blank on its axis and simultaneously producing an additional relative movement between the cutting edges and blank about an axis offset from the blank axis.

20. The method of producing a bevel gear which consists in generating its side tooth surfaces two sides simultaneously by moving a pair of cutting edges of circular arc profile in concentric curved paths across the face of a tapered gear blank and simultaneously producing an additional relative movement between the cutting edges and blank corresponding to that of a gear meshing with a crown gear whose axis is offset from the axis of the blank.

21. The method of producing a pair of bevel gears which consists in cutting the side tooth surfaces of each member of the pair by moving a finish cutting edge of circular arc profile in a curved path across the face of a tapered gear blank while rotating the blank on its axis and simultaneously imparting an additional relative movement between the cutting edge and blank about an axis offset from the blank axis.

22. The method of producing a pair of bevel gears which consists in cutting the side tooth surfaces of each member of the pair by moving a finish cutting edge of circular arc profile in a curved path across the face of a tapered gear blank while imparting an additional relative movement between the cutting edge and blank corresponding to that of a gear meshing with a crown gear whose axis is offset from the axis of the blank.

23. The method of producing a bevel gear which consists in generating its side tooth surfaces, two sides simultaneously with a rotary annular face mill, provided with cutting edges of circular arc profile adapted to finish cut opposite side tooth faces of the blank, by rotating said tool in engagement with a tapered gear blank while imparting an additional relative movement between said tool and blank, as though the blank were meshing with a basic gear, represented by the tool, whose axis is offset from the axis of the blank.

24. The method of producing a pair of bevel gears which consists in cutting the side tooth surfaces of each member of the pair with a rotary annular face mill, provided with finish cutting edges of circular arc profile, by rotating said tool in engagement with a tapered gear blank while simultaneously imparting an additional relative movement between the tool and blank as though the blank were meshing with a basic gear represented by the tool, whose axis is offset from the axis of the blank.

ERNEST WILDHABER.